United States Patent [19]
Baek et al.

[11] Patent Number: 5,330,123
[45] Date of Patent: Jul. 19, 1994

[54] UNITARY BODY FOR MOUNTING TAPE TRANSPORT ELEMENTS

[75] Inventors: Myung C. Baek, Suwon; Yu S. Chae, Kyungki, both of Rep. of Korea

[73] Assignee: Goldstar Co., Ltd., Seoul, Rep. of Korea

[21] Appl. No.: 736,763

[22] Filed: Jul. 29, 1991

[30] Foreign Application Priority Data

Jul. 31, 1990 [KR] Rep. of Korea ............... 11415/1990

[51] Int. Cl.⁵ ...................... G11B 15/60; G11B 21/16
[52] U.S. Cl. .................... 242/346.1; 360/95; 360/130.21
[58] Field of Search ............. 242/198, 199; 360/95, 360/96.1, 130.21, 130.24, 130.31

[56] References Cited

U.S. PATENT DOCUMENTS

| | | | |
|---|---|---|---|
| 3,984,870 | 10/1976 | Inoue | 360/95 X |
| 4,811,134 | 3/1989 | Takano | 360/95 X |
| 4,814,910 | 3/1989 | Kaku et al. | 360/95 X |
| 4,930,028 | 5/1990 | Kunimaru et al. | 360/95 X |
| 4,930,720 | 6/1990 | Hwang | 242/198 |
| 5,077,624 | 12/1991 | Nakanishi | 360/95 X |

FOREIGN PATENT DOCUMENTS

| | | | |
|---|---|---|---|
| 3643125 | 6/1987 | Fed. Rep. of Germany | 360/130.24 |
| 138312 | 12/1978 | Japan | 360/95 |
| 63-70959 | 3/1988 | Japan | 360/130.24 |
| 2-260193 | 10/1990 | Japan | 360/130.24 |

Primary Examiner—Daniel P. Stodola
Assistant Examiner—John Q. Nguyen
Attorney, Agent, or Firm—Fish & Richardson

[57] ABSTRACT

A unitary guide body which includes structural elements for tape loading and unloading, particularly for use in a VCR deck, which is constructed to include as a part of the unitary guide body a pair of guide grooves for guiding a pair of slant bases acting to load a tape to a drum, a guide groove formed adjacent to one of the slant base guide grooves for guiding a tape guide roller, stoppers disposed adjacent to leading ends of the guide groove to position the slant bases and the guide roller, a drum receiving recess for slantly mounting a drum at an inclination angle of a given angle, a plurality of drum fastening holes, a shaft for an I-shaped roller, and a main slant post, which provide for an enhanced production rate of the elements forming parts of the unitary guide body while overall product quality is maintained.

2 Claims, 5 Drawing Sheets

UNITARY BODY FOR MOUNTING TAPE TRANSPORT ELEMENTS

BACKGROUND OF THE INVENTION

1. Field of the Invention

This invention relates to a tape transport and guide structure for a video cassette recorder (VCR), which transports a tape and positions a drum in a tape loading and unloading apparatus of the VCR, which transfers the tape in a cassette to bring it into and out of engagement with the drum.

2. Description of the Prior Art

Generally, a drive mechanism of a tape loading and unloading apparatus which brings a tape for a video cassette recorder(VCR) into and out of engagement with a drum is of any one of two types: a ring type utilizing two rotary rings and a cam type utilizing cams. The conventional tape loading apparatus of a VCR deck, which has the ring type drive mechanism commercially available from Gold Star Co., Ltd. in Korea, under Model NO. GS-CIP is in the form as shown in FIGS. 3 to 5 of the accompanying drawings, which comprises a pair of slant bases (2) each having a guide roller(1) and disposed on a guide rail(4) for movement along a pair of guide grooves(3) of the rail, V-shaped stoppers(5) functioning to stop the movement of the slant bases(2) along the guide grooves(3), thereby determining a final position of the tape, a drum base (not shown in FIG. 3 because it is located under a drum(6) slantly supporting the drum(6) at an incline of a given angle, a main slant post(7) turning round the drum, and a main slant post stopper(8) having a stopping groove (8a) for receiving the main slant post(7). In addition, a pair of support shafts (9a, 9b) defining a reference plane for a cassette are fixedly mounted on a main base of the deck, on which the drum base is disposed, at positions adjacent to the tape supply and take-up reels, respectively.

With the construction having such principal elements, as can be seen in FIG. 4 showing a tape transport system, the tape(10) is brought into engagement with the drum(6) by the movement of the guide rollers(1) mounted on the slant bases(2) from stationary positions shown in FIG. 3 to positions in FIG. 4 along the guide grooves(3) of the guide rail(4) and the movement of the main slant post(7) round the drum. In this loaded state, a picture can be recorded on the tape through the drum, or a picture previously recorded on the tape may be played back.

At this point, the turning movement of the main slant post causes the tape to be passed through the drum at a given angle which is kept in a vertically oriented posture by means of a main slant post turning mechanism as shown in FIG. 5. More specifically, when the driving force of a loading motor (not shown) is transmitted to a loading gear(11), the gear rotates a cam gear(13) through a connecting gear(12) interposed between them. At this time, since a pin(17) of a lever cam(14) is received in a curved groove (13a) formed in the cam gear(13) to be slidingly movable along the groove, the rotation of the loading gear(11) leads to counterclockwise rotation of a lower toothed end(14a) of the lever cam(14) through a series of gears comprising the loading gear(11), the connecting gear(12), the cam gear(13) and the lever cam (14), thereby resulting in clockwise rotation of a gear(16) of a post arm(15), which is engaged with the toothed end(14a). As a result, the post arm(15) is rotated from a position as indicated by the two-dot-and-dash lines in FIG. 5 to a position as indicated by the solid line, so that the main slant post (7) fixed to a free end of the post arm(15) is moved toward and received in the stopping groove(8a) of the main slant post stopper(8), thereby guiding the travel of the tape.

During the turning movement of the main slant post, a pair of the slant bases(2) movable along the guide grooves(3) are also moved from a stop position of the guide rail as shown in FIG. 3 to a position of the V-shaped stopper mounted on the drum base along a pair of the semicircular guide grooves (3) formed in the guide rail(4) by means of a loading mechanism (not shown), whereby the guide rollers(1) on the slant bases(2) bring the tape into engagement with the drum(6). The other of the V-shaped stoppers (5) functioning to stop the movement of the slant bases is not shown in FIG. 3 because it is positioned behind the drum(6).

In the cam type drive mechanism (commercially available from SONY Company in Japan, under Model No. TR-55) other than the above described ring type drive mechanism acting to load the tape by means of the rotary ring gear, the basic operation of loading and unloading the tape us substantially the same as that of the ring type. The cam type is, however, different from the ring type in that the former utilizes a cam gear and a folding lever for moving the slant bases so as to engage the tape with the drum, in place of the ring gear of the latter. In addition, the cam type drive mechanism does not carry out the turning movement of the main slant post by the post turning mechanism as described above, but utilizes a main slant post fixedly mounted at a given angle and a separate tape guide roller movable along a guide groove formed in a guide rail in order to permit the tape passed through the main slant post via the guide roller to be maintained in a vertically oriented posture.

As described above, both the ring type and cam type drive mechanisms are complex in construction, requiring a plurality of parts. More particularly, the ring type drive mechanism comprises a plurality of parts, such as the guide rail for guiding the moving slant bases, the drum base for mounting the drum, the V-shaped stoppers, the movable main slant post, the support shafts for supporting the cassette, and the main slant post turning device, all of the them being mounted on a main base, while the cam type drive mechanism comprises a plurality of parts, such as the guide rail for guiding the moving slant bases, the stoppers mounted on the guide rail, the drum base for mounting the drum, the fixedly mounted main slant post, and the tape guide roller movable on the guide rail, all of them being individually mounted on a main base. As a result, finishing and assembly errors of the respective parts may adversely affect stability of the entire tape transport system and product quality. Further, the requirement for a plurality of the elements results in complicated, tedious assembly work and lower manufacturing efficiency.

SUMMARY OF THE INVENTION

With the foregoing problem of the prior art in view, it is an object of the present invention to provide a tape transport and guide structure for a video cassette recorder, comprising a unitary guide body into which a plurality of parts as described above are integrated.

To achieve the above object, there is provided according to the present invention a tape transport and guide structure for a video cassette recorder, comprising a unitary guide body which is provided with a pair of guide grooves for guiding a pair of slant bases acting to load a tape to a drum, a guide groove formed adjacent to one of the slant base guide grooves for guiding a tape guide roller, stoppers each disposed adjacent to each of leading ends of the guide grooves to position the slant bases and the guide roller, a drum receiving recess for slantly mounting a drum with an incline of a given angle, a plurality of drum fastening holes, a pair of support shafts for defining a reference plane for a cassette, a shaft for mounting an I-shaped roller, and main slant post.

BRIEF DESCRIPTION OF THE DRAWINGS

The invention will now be described by way of example, with reference to the accompanying drawings, in which.

DESCRIPTION OF THE PREFERRED EMBODIMENT

Figure 1:
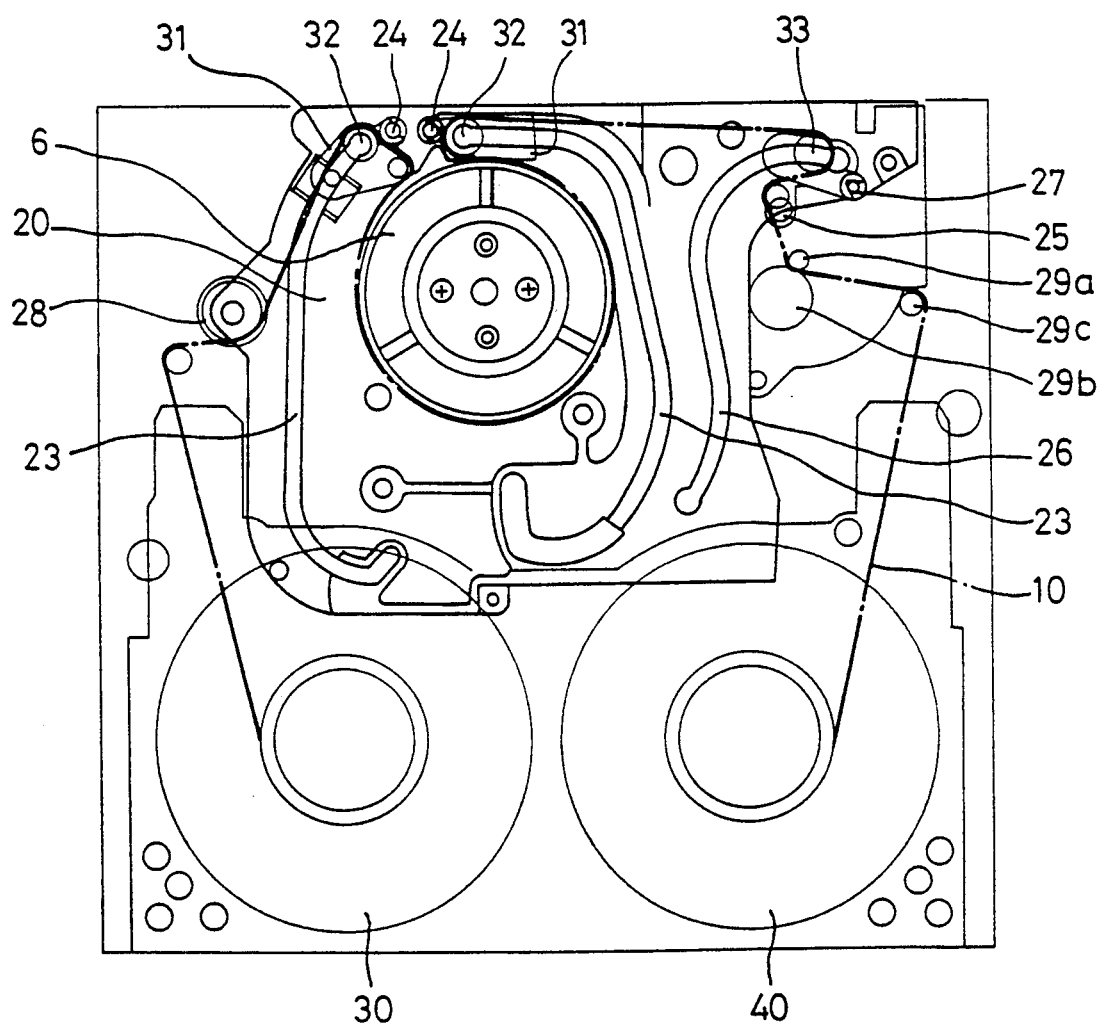
FIG. 1 is a plan view of a tape transport and guide structure according to the present invention, showing a tape in a traveling position.
Figure 2:
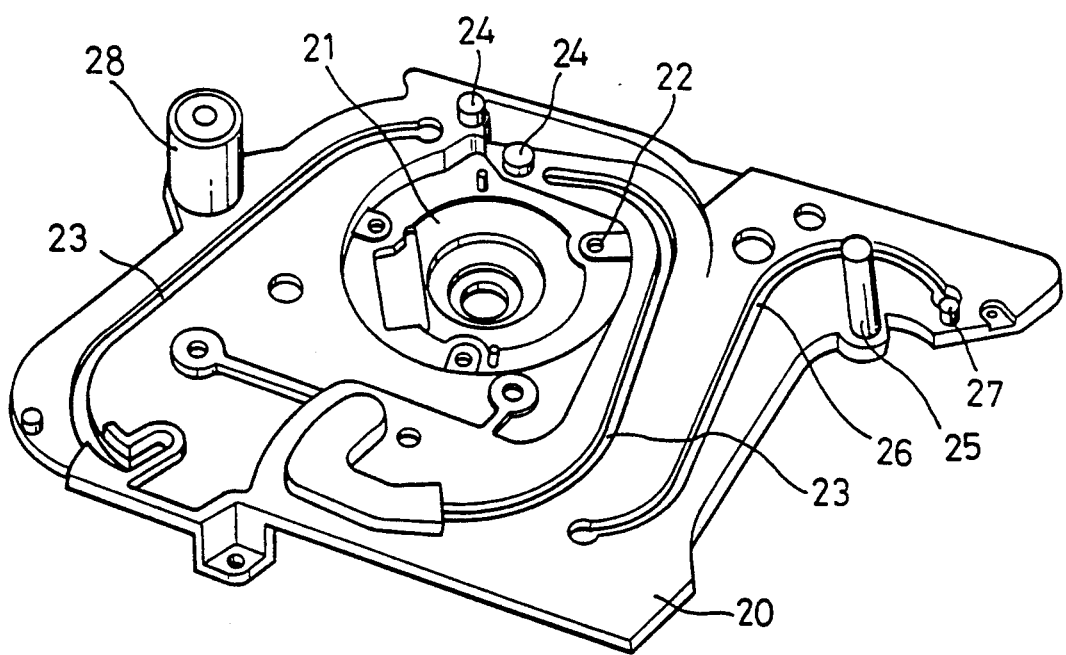
FIG. 2 is a perspective view of the structure of the present invention.
Figure 3:
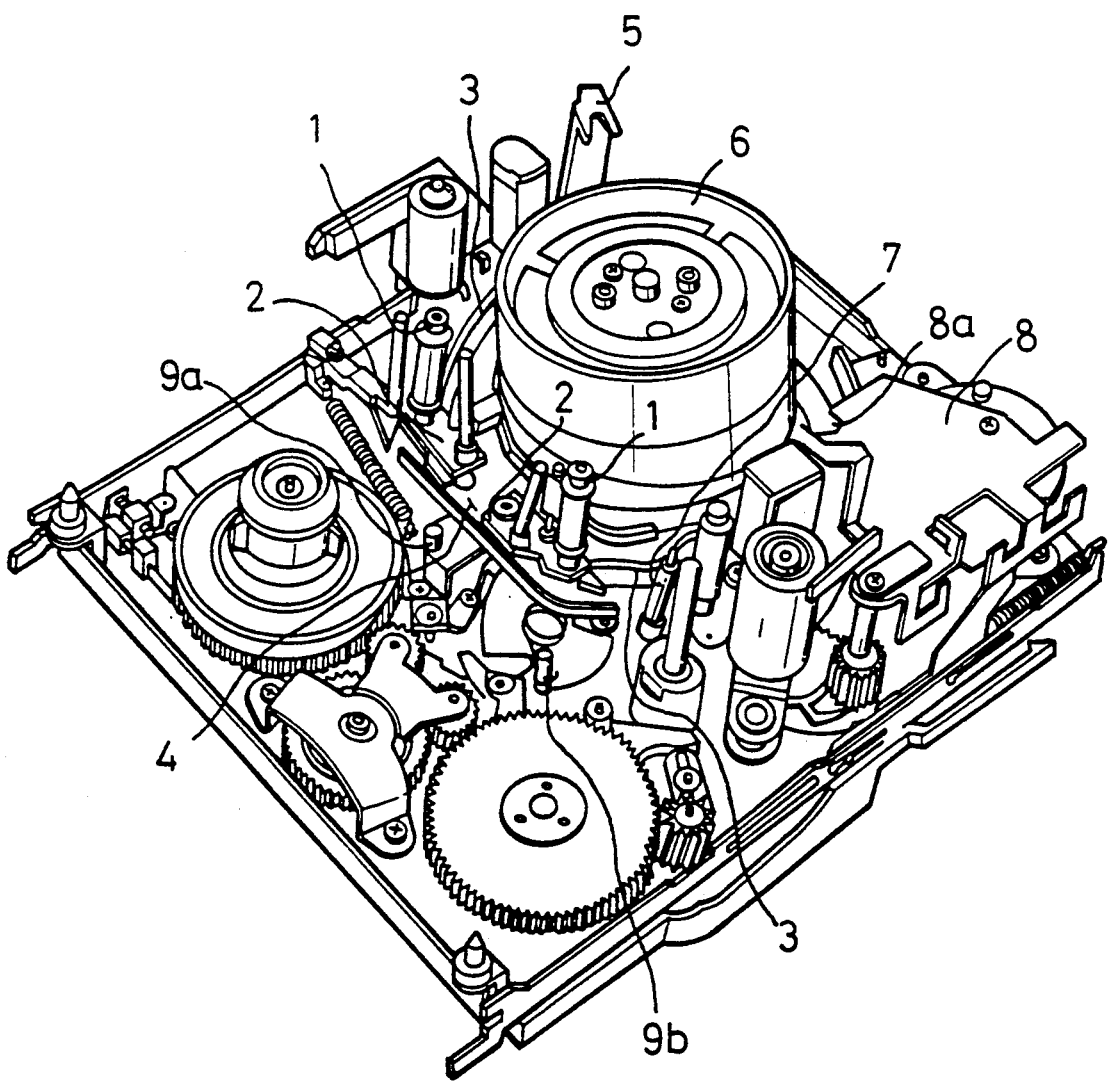
FIG. 3 is a perspective view of one form of a VCR deck according to the prior art.
Figure 4:
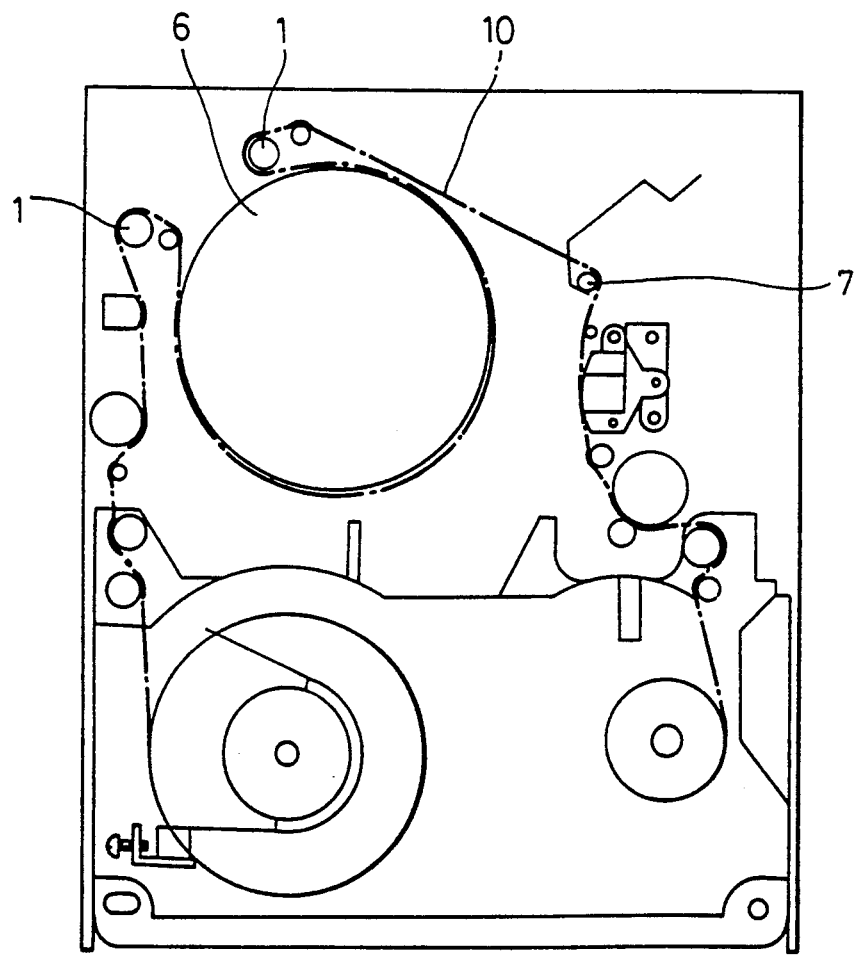
FIG. 4 is a plan view of the VCR deck shown in FIG. 3, showing a tape traveling path.
Figure 5:
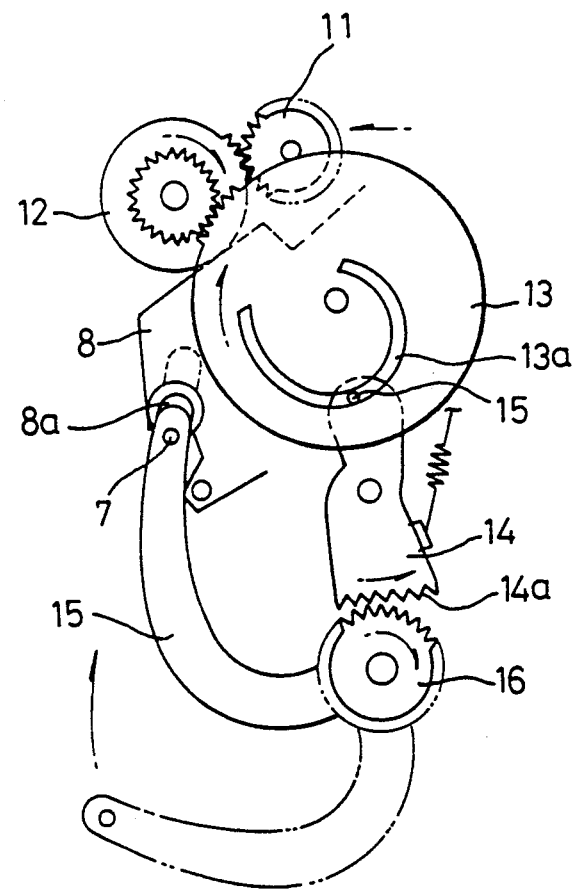
FIG. 5 is a view showing turning motion of a main slant post in the VCR deck shown in FIG. 3.

Referring to FIGS. 1 and 2 which respectively illustrates plan and perspective views of an integral tape guide structure according to the present invention, a preferred embodiment of the invention provides improvements in a drive mechanism of a cam type of the conventional ring and cam types as described aboved.

First, as shown in FIG. 2, the integral guide structure of the present invention comprises a guide body(20) formed entirely of unitary casting and provided at its central portion with a drum receiving recess(21) for seating a slantly mounted drum conforming to a predetermined angle of inclination of the drum, and a plurality of holes(22) for fastening the drum. There are also formed on the opposite sides of the drum receiving recess(21) a pair of guide grooves(23) for guiding slant bases movable to load a tape. One of the guide grooves (23) right groove in FIG. 2) has an inclined end distal to the drum receiving recess for slantly traveling the tape. In addition, stoppers(24) are each disposed adjacent to each of leading ends of the guide grooves(23) to stop the slant bases moving along the guide grooves, thereby bring the tape into engagement with the drum.

Further, there are provided on a right side portion of the guide body(20) adjacent to the one of the guide grooves(23) a guide groove(26) for guiding a guide roller(33)(see FIG. 1) moving toward a main slant post(25), and another stopper(27) located adjacent to a distal end of the guide groove(26) to stop the movement of the guide roller. The main slant post(25) is fixedly mounted with an incline of a given angle at a position near an upper end portion (as viewed in the drawing) of the guide groove(26). Also a shaft for mounting an I-shaped roller(28) for guiding the travel of the tape being fed from a tape supply reel is disposed adjacent to the other of the guide grooves(23). Therefore, principal elements of a tape loading and unloading mechanism functioning to bring the tape into and out of engagement with the drum perform the operation of guiding the travel of the tape in combination with the unitary guide body(20) as shown in FIG. 2.

The traveling condition of the tape(10) loaded to the drum(6) on the guide body(20) of the invention is shown in FIG. 1. The tape(10) being fed from the supply reel(30) passes in order through the I-shaped roller(28) mounted on the integral guide body(20), one of rollers(32) of the slant bases(31) moved along the guide grooves(23) and then stopped by the stoppers(24), the drum(6), and the other of the rollers(32) of the slant bases(31). Then, the tape(10) passes through the guide roller(33) moved along the guide groove(26) to the distal end of the groove, and then is wound on a take-up reel(40) via the main slant post(25) and other guide rollers(29a, 29b, 29c). Briefly described again, in the loaded condition, the tape travels along the path comprising the supply reel(30), the I-shaped roller(28), the roller(32) of the supply side slant base, the drum(6), the roller(32) of the take-up side slant base, the guide roller(33), the main slant post (25), the guide rollers(29a, 29b, 29c), and the take-up reel (40).

As described above, according to the present invention, since the shaft for mounting the I-shaped roller for guiding the travel of the tape, the guide grooves for guiding a pair of the slant bases, the drum receiving recess for mounting the drum, the guide groove for guiding the tape guide roller, and the stationary main slant post are integrally provided on the unitary guide body, finishing and assembly errors which are liable to occur in the prior art apparatus comprised of a plurality of parts may be considerably diminished, resulting in enhancing stability of performance of the tape transport system and product quality.

In addition, the unitary guide body of the present invention enables to simply assemble a semiassembly of the elements to the main base, thereby greatly simplifying a assembly task. Furthermore, the unitary guide body of the invention is also applicable to the ring type drive mechanism other than the cam type described above as a preferred embodiment of the invention, and may be variously modified to be applied to magnetic recording apparatuses, such as a DAT (Digital Audio Tape) player, or the like functioning similarly to the VCR without departing from a basic concept of this invention.

Having described but a single embodiment of this invention, it will be apparent that many changes and modifications can be made therein without departing from the spirit and scope of the invention as defined in the appended claim.

What is claimed is:

1. In a tape transport and guide structure for a video cassette recorder, a homogenous one-piece guide body comprising a pair of guide grooves for guiding a pair of slant bases acting to load a tape to a drum, a guide groove formed adjacent to one of said slant base guide grooves for guiding a tape guide roller, stoppers disposed adjacent to leading ends of said guide grooves to position said slant bases and said guide roller, a drum receiving recess for slantly mounting a drum at an incline of a given angle, a plurality of drum fastening holes, and a shaft for mounting an I-shaped tape guide roller and a main slant post, both of which guide the tape along a path through the guide body.

2. A homogenous one-piece guide body comprising a pair of guide grooves for guiding a pair of slant bases acting to load a tape to a drum, a guide groove formed adjacent to one of said slant base guide grooves for guiding a tape guide roller, stoppers disposed adjacent to leading ends of said guide grooves to position said slant bases and said guide roller, a drum receiving recess between said pair of slant base guide grooves for slantly mounting a drum at an incline of a given angle, a plurality of drum fastening holes for mounting said drum to said drum receiving recess, a shaft for mounting an I-shaped tape guide roller adjacent to one of said slant base guide grooves and a main slant post fixedly mounted to said guide body near said leading end of said adjacent guide groove, both of which guide the tape along a path through the guide body.

* * * * *